US012424229B2

(12) United States Patent
Kordon et al.

(10) Patent No.: US 12,424,229 B2
(45) Date of Patent: *Sep. 23, 2025

(54) METHODS AND APPARATUS FOR DETERMINING FOR DECODING A COMPRESSED HOA SOUND REPRESENTATION

(71) Applicant: Dolby Laboratories Licensing Corporation, San Francisco, CA (US)

(72) Inventors: Sven Kordon, Wunstorf (DE); Alexander Krueger, Burgdorf (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,897

(22) Filed: Dec. 20, 2023

(65) Prior Publication Data

US 2024/0212692 A1 Jun. 27, 2024

Related U.S. Application Data

(60) Continuation of application No. 17/733,757, filed on Apr. 29, 2022, now Pat. No. 11,875,803, which is a (Continued)

(30) Foreign Application Priority Data

Jun. 27, 2014 (EP) .................................... 14306023

(51) Int. Cl.
*G10L 19/008* (2013.01)
*H04S 7/00* (2006.01)

(52) U.S. Cl.
CPC .............. *G10L 19/008* (2013.01); *H04S 7/30* (2013.01); *H04S 2400/11* (2013.01); *H04S 2420/11* (2013.01)

(58) Field of Classification Search
None
See application file for complete search history.

(56) References Cited

U.S. PATENT DOCUMENTS 5,757,927 A 5/1998 Gerzon et al.
6,664,662 B2 12/2003 Melin
(Continued)

FOREIGN PATENT DOCUMENTS

CA 2238026 C 7/2002
CN 1677492 A 10/2005
(Continued)

OTHER PUBLICATIONS

Fei, X., et al., Discrete Cosine Transform-Based ECG Data Compession By Template, Space Medicine & Medical Engineering, Nov. 20, 2000, Issue: 6, p. 435-439.
(Continued)

*Primary Examiner* — Hemant S Patel

(57) ABSTRACT

When compressing an HOA data frame representation, a gain control (15, 151) is applied for each channel signal before it is perceptually encoded (16). The gain values are transferred in a differential manner as side information. However, for starting decoding of such streamed compressed HOA data frame representation absolute gain values are required, which should be coded with a minimum number of bits. For determining such lowest integer number ($\beta_e$) of bits the HOA data frame representation (C(k)) is rendered in spatial domain to virtual loudspeaker signals lying on a unit sphere, followed by normalisation of the HOA data frame representation (C(k)). Then the lowest integer number of bits is set to $$\beta_e = \lceil \log_2(\lceil \log_2(\sqrt{K_{MAX}} \cdot O) \rceil + 1) \rceil.$$

1 Claim, 4 Drawing Sheets

Related U.S. Application Data continuation of application No. 17/116,900, filed on Dec. 9, 2020, now Pat. No. 11,322,165, which is a division of application No. 16/255,358, filed on Jan. 23, 2019, now Pat. No. 10,872,612, which is a division of application No. 15/319,699, filed as application No. PCT/EP2015/063912 on Jun. 22, 2015, now Pat. No. 10,236,003.

(56) References Cited

U.S. PATENT DOCUMENTS

| | | | | |
|---|---|---|---|---|
| 9,792,924 | B2 * | 10/2017 | Krueger | H04S 3/02 |
| 9,794,713 | B2 | 10/2017 | Kordon | |
| 9,922,657 | B2 * | 3/2018 | Krueger | G10L 19/008 |
| 10,037,764 | B2 * | 7/2018 | Krueger | G10L 19/008 |
| 10,224,044 | B2 * | 3/2019 | Krueger | G10L 19/008 |
| 10,236,003 | B2 | 3/2019 | Kordon | |
| 10,580,426 | B2 * | 3/2020 | Krueger | G10L 19/20 |
| 10,621,995 | B2 * | 4/2020 | Kordon | G10L 19/008 |
| 10,872,612 | B2 * | 12/2020 | Kordon | G10L 19/008 |
| 11,322,165 | B2 * | 5/2022 | Kordon | G10L 19/008 |
| 11,875,803 | B2 * | 1/2024 | Kordon | G10L 19/008 |
| 2012/0155653 | A1 | 6/2012 | Jax et al. | |
| 2013/0216070 | A1 | 8/2013 | Keiler | |
| 2014/0358565 | A1 | 12/2014 | Peters | |
| 2015/0098572 | A1 | 4/2015 | Batke et al. | |
| 2015/0271621 | A1 | 9/2015 | Sen | |
| 2015/0332679 | A1 | 11/2015 | Kruger | |
| 2016/0088415 | A1 | 3/2016 | Krueger et al. | |
| 2016/0150341 | A1 | 5/2016 | Kordon et al. | |
| 2016/0255452 | A1 | 9/2016 | Nowak | |

FOREIGN PATENT DOCUMENTS

| | | | |
|---|---|---|---|
| CN | 103313182 | B | 9/2009 |
| CN | 101128866 | B | 9/2011 |
| CN | 101872618 | B | 8/2012 |
| CN | 101523733 | B | 6/2013 |
| CN | 103250207 | A | 8/2013 |
| CN | 102823277 | B | 7/2015 |
| CN | 103635964 | B | 5/2016 |
| CN | 102547549 | B | 6/2016 |
| CN | 106471822 | A | 3/2017 |
| CN | 104285390 | B | 6/2017 |
| CN | 104428833 | B | 9/2017 |
| CN | 112216292 | A | 1/2021 |
| CN | 112908349 | A | 6/2021 |
| CN | 112951254 | A | 6/2021 |
| CN | 113793618 | A | 12/2021 |
| CN | 113808598 | A | 12/2021 |
| CN | 113808599 | A | 12/2021 |
| CN | 113808600 | A | 12/2021 |
| CN | 112908348 | B | 7/2022 |
| CN | 110556120 | B | 2/2023 |
| EP | 2451196 | A1 | 5/2012 |
| EP | 2665208 | A1 | 11/2013 |
| EP | 2743922 | A1 | 6/2014 |
| EP | 2800401 | A1 | 11/2014 |
| EP | 2824661 | A1 | 1/2015 |
| JP | 2012-133366 | A | 7/2008 |
| JP | 6869296 | B2 | 5/2021 |
| KR | 20170023017 | A | 3/2017 |
| KR | 20170023866 | A | 3/2017 |
| KR | 102428370 | B1 | 8/2022 |
| RU | 2421828 | C2 | 6/2011 |
| TW | 200915786 | A | 4/2009 |
| TW | 201412145 | A | 3/2014 |
| WO | 2009/001874 | A1 | 12/2008 |
| WO | 2013/176959 | A1 | 11/2013 |
| WO | 2013171083 | A1 | 11/2013 |
| WO | 2014/012944 | A1 | 1/2014 |
| WO | 2014/090660 | A1 | 6/2014 |

OTHER PUBLICATIONS

"ISO/IEC JTC 1/SC 29 N ISO/IEC CD 23008-3, Information Technology—High Efficiency Coding and Media Delivery in Heterogeneous Environments—Part 3: 3D Audio" MPEG Document Ni4459, Apr. 4, 2014.

Fliege, Jorg "A Two-Stage Approach for Computing Cubature Formulae for the Sphere" Fachbereich Mathematic Dortmund Germany, 1999, pp. 1-31.

Integration Nodes for the Sphere, 2015, http://www.mathematik.uni-dortmund.de/lsx/research/projects/fliege/nodes/nodes.html.

ISO/IEC JTC1/SC29/WG11 N14264, "WD1-HOA Text of MPEG-H 3D Audio" Coding of Moving Pictures and Audio, Jan. 2014, pp. 1-86.

Jerome Daniel, "Representation de Champs Acoustiques, application a la transmission et a la reproduction de scenes Sonores Complexes dans un Context Multimedia" Jul. 31, 2001.

Johannes Boehm, et al "Detailed Technical Description of 3D Audio Phase 2 Reference Model 0 for HOA Technologies" MPEG MEeting Oct. 20, 2014-Oct. 24, 2014.

Rafaely, Boaz "Plane Wave Decomposition of the Sound Field on a Sphere by Spherical Convolution" ISVR Technical Memorandum 910, May 2003, pp. 1-40.

Sun, H. et al "Optimal Higher Order Ambisonics Encoding with Predefined Constraints" IEEE Transactions on Audio, Speech and Language Processing, vol. 20, Issue 3, Mar. 2012.

Williams, Earl, "Fourier Acoustics" Chapter 6 Spherical Waves, pp. 183-186, Jun. 1999.

ISO/IEC JTC 1/SC 29, ISO/IEC 23008-3:201x(E), Information Technology—High efficiency coding and media delivery in heterogeneous environments—Part 3: 3D Audio, Oct. 12, 2016, 799 pages.

* cited by examiner

METHODS AND APPARATUS FOR DETERMINING FOR DECODING A COMPRESSED HOA SOUND REPRESENTATION

CROSS REFERENCE TO RELATED APPLICATIONS

This application is a continuation of U.S. patent application Ser. No. 17/733,757, filed Apr. 29, 2022, which is a continuation of U.S. patent application Ser. No. 17/116,900, filed Dec. 9, 2020, now U.S. Pat. No. 11,322,165, which is a divisional of U.S. patent application Ser. No. 16/255,358, filed Jan. 23, 2019, now U.S. Pat. No. 10,872,612, which is a divisional of U.S. patent application Ser. No. 15/319,699, filed Dec. 16, 2013, now U.S. Pat. No. 10,236,003, which is the U.S. National Stage of PCT/EP2015/063912, filed Jun. 22, 2015, which claims priority to European Patent Application No. 14306023.4, filed Jun. 27, 2014, each of which is incorporated by reference in its entirety.

TECHNICAL FIELD

The invention relates to a method and to an apparatus for determining for the compression of an HOA data frame representation a lowest integer number of bits required for representing non-differential gain values associated with channel signals of specific ones of said HOA data frames.

BACKGROUND

Higher Order Ambisonics denoted HOA offers one possibility to represent three-dimensional sound. Other techniques are wave field synthesis (WFS) or channel based approaches like 22.2. In contrast to channel based methods, the HOA representation offers the advantage of being independent of a specific loudspeaker set-up. However, this flexibility is at the expense of a decoding process which is required for the playback of the HOA representation on a particular loudspeaker set-up. Compared to the WFS approach, where the number of required loudspeakers is usually very large, HOA may also be rendered to set-ups consisting of only few loudspeakers. A further advantage of HOA is that the same representation can also be employed without any modification for binaural rendering to headphones.

HOA is based on the representation of the spatial density of complex harmonic plane wave amplitudes by a truncated Spherical Harmonics (SH) expansion. Each expansion coefficient is a function of angular frequency, which can be equivalently represented by a time domain function. Hence, without loss of generality, the complete HOA sound field representation actually can be assumed to consist of O time domain functions, where O denotes the number of expansion coefficients. These time domain functions will be equivalently referred to as HOA coefficient sequences or as HOA channels in the following.

The spatial resolution of the HOA representation improves with a growing maximum order N of the expansion. Unfortunately, the number of expansion coefficients O grows quadratically with the order N, in particular $O=(N+1)^2$. For example, typical HOA representations using order N=4 require O=25 HOA (expansion) coefficients. The total bit rate for the transmission of HOA representation, given a desired single-channel sampling rate $f_S$ and the number of bits $N_b$ per sample, is determined by $O \cdot f_S \cdot N_b$. Transmitting an HOA representation of order N=4 with a sampling rate of $f_S=48$ kHz employing $N_b=16$ bits per sample results in a bit rate of 19.2 MBits/s, which is very high for many practical applications, e.g. streaming. Thus, compression of HOA representations is highly desirable.

Previously, the compression of HOA sound field representations was proposed in EP 2665208 A1, EP 2743922 A1, EP 2800401 A1, cf. ISO/IEC JTC1/SC29/WG11, N14264, WD1-HOA Text of MPEG-H 3D Audio, January 2014. These approaches have in common that they perform a sound field analysis and decompose the given HOA representation into a directional component and a residual ambient component. The final compressed representation is on one hand assumed to consist of a number of quantised signals, resulting from the perceptual coding of directional and vector-based signals as well as relevant coefficient sequences of the ambient HOA component. On the other hand, it comprises additional side information related to the quantised signals, which side information is required for the reconstruction of the HOA representation from its compressed version.

Before being passed to the perceptual encoder, these intermediate time-domain signals are required to have a maximum amplitude within the value range $[-1,1[$, which is a requirement arising from the implementation of currently available perceptual encoders. In order to satisfy this requirement when compressing HOA representations, a gain control processing unit (sec EP 2824661 A1 and the above-mentioned ISO/IEC JTC1/SC29/WG11 N14264 document) is used ahead of the perceptual encoders, which smoothly attenuates or amplifies the input signals. The resulting signal modification is assumed to be invertible and to be applied frame-wise, where in particular the change of the signal amplitudes between successive frames is assumed to be a power of '2'. For facilitating inversion of this signal modification in the HOA decompressor, corresponding normalisation side information is included in total side information. This normalisation side information can consist of exponents to base '2', which exponents describe the relative amplitude change between two successive frames. These exponents are coded using a run length code according to the above-mentioned ISO/IEC JTC1/SC29/WG11 N14264 document, since minor amplitude changes between successive frames are more probable than greater ones.

SUMMARY OF INVENTION

Using differentially coded amplitude changes for reconstructing the original signal amplitudes in the HOA decompression is feasible e.g. in case a single file is decompressed from the beginning to the end without any temporal jumps. However, to facilitate random access, independent access units have to be present in the coded representation (which is typically a bit stream) in order to allow starting of the decompression from a desired position (or at least in the vicinity of it), independently of the information from previous frames. Such an independent access unit has to contain the total absolute amplitude change (i.e. a non-differential gain value) caused by the gain control processing unit from the first frame up to a current frame. Assuming that amplitude changes between two successive frames are a power of '2', it is sufficient to also describe the total absolute amplitude change by an exponent to base '2'. For an efficient coding of this exponent, it is essential to know the potential maximum gains of the signals before the application of the gain control processing unit. However, this knowledge is highly dependent on the specification of constraints on the value range of the HOA representations to be compressed.

Unfortunately, the MPEG-H 3D audio document ISO/IEC JTC1/SC29/WG11 N14264 does only provide a description of the format for the input HOA representation, without setting any constraints on the value ranges.

A problem to be solved by the invention is to provide a lowest integer number of bits required for representing the non-differential gain values.

The invention establishes an inter-relation between the value range of the input HOA representation and the potential maximum gains of the signals before the application of the gain control processing unit within the HOA compressor. Based on that inter-relation, the amount of required bits is determined—for a given specification for the value range of an input HOA representation—for an efficient coding of the exponents to base '2' for describing within an access unit the total absolute amplitude changes (i.e. a non-differential gain value) of the modified signals caused by the gain control processing unit from the first frame up to a current frame.

Further, once the rule for the computation of the amount of required bits for the coding of the exponent is fixed, the invention uses a processing for verifying whether a given HOA representation satisfies the required value range constraints such that it can be compressed correctly.

In principle, the inventive method is suited for determining for the compression of an HOA data frame representation a lowest integer number Be of bits required for representing non-differential gain values for channel signals of specific ones of said HOA data frames, wherein each channel signal in each frame comprises a group of sample values and wherein to each channel signal of each one of said HOA data frames a differential gain value is assigned and such differential gain value causes a change of amplitudes of the sample values of a channel signal in a current HOA data frame with respect to the sample values of that channel signal in the previous HOA data frame, and wherein such gain adapted channel signals are encoded in an encoder, and wherein said HOA data frame representation was rendered in spatial domain to O virtual loudspeaker signals $w_j(t)$, where the positions of the virtual loudspeakers are lying on a unit sphere and are targeted to be distributed uniformly on that unit sphere, said rendering being represented by a matrix multiplication $w(t)=(\psi)^{-1}\cdot c(t)$, wherein w(t) is a vector containing all virtual loudspeaker signals, $\psi$ is a virtual loudspeaker positions mode matrix, and c(t) is a vector of the corresponding HOA coefficient sequences of said HOA data frame representation, and wherein said HOA data frame representation was normalised such that $$\|w(t)\|_\infty = \max_{1\le j\le O} |w_j(t)| \le 1 \forall\, t,$$

said method including the steps:

forming said channel signals by one or more of substeps a), b), c) from said normalised HOA data frame representation:

a) for representing predominant sound signals in said channel signals, multiplying said vector of HOA coefficient sequences c(t) by a mixing matrix A, the Euclidean norm of which mixing matrix A is not greater than '1', wherein mixing matrix A represents a linear combination of coefficient sequences of said normalised HOA data frame representation;

b) for representing an ambient component $c_{AMB}(t)$ in said channel signals, subtracting said predominant sound signals from said normalised HOA data frame representation, and selecting at least part of the coefficient sequences of said ambient component $c_{AMB}(t)$, wherein $\|c_{AMB}(t)\|_2^2 \le \|c(t)\|_2^2$, and transforming the resulting minimum ambient component $C_{AMB,MIN}(t)$ by computing $$w_{MIN}(t) = \Psi_{MIN}^{-1}\cdot c_{AMB,MIN}(t),$$

wherein $$\|\Psi_{MIN}^{-1}\|_2 < 1$$

and $\psi_{MIN}$ is a mode matrix for said minimum ambient component $c_{AMB,MIN}(t)$;

c) selecting part of said HOA coefficient sequences c(t), wherein the selected coefficient sequences relate to coefficient sequences of the ambient HOA component to which a spatial transform is applied, and the minimum order $N_{MIN}$ describing the number of said selected coefficient sequences is $N_{MIN} \le 9$;

setting said lowest integer number $\beta_e$ of bits required for representing said non-differential gain values for said channel signals to $$\beta_e = \lceil \log_2(\lceil \log_2(\sqrt{K_{MAX}}\cdot O)\rceil + 1)\rceil,$$

wherein $K_{MAX}=\max_{1\le N\le N_{MAX}} K(N, \Omega_1^{(N)}, \ldots, \Omega_O^{(N)})$, N is the order, $N_{MAX}$ is a maximum order of interest, $\Omega_1^{(N)}, \ldots, \Omega_O^{(N)}$ are directions of said virtual loudspeakers, $O=(N+1)^2$ is the number of HOA coefficient sequences, and K is a ratio between the squared Euclidean norm $\|\psi\|_2^2$ of said mode matrix and O.

In principle the inventive apparatus is suited for determining for the compression of an HOA data frame representation a lowest integer number $\beta_e$ of bits required for representing non-differential gain values for channel signals of specific ones of said HOA data frames, wherein each channel signal in each frame comprises a group of sample values and wherein to each channel signal of each one of said HOA data frames a differential gain value is assigned and such differential gain value causes a change of amplitudes of the sample values of a channel signal in a current HOA data frame with respect to the sample values of that channel signal in the previous HOA data frame, and wherein such gain adapted channel signals are encoded in an encoder, and wherein said HOA data frame representation was rendered in spatial domain to O virtual loudspeaker signals $w_j(t)$, where the positions of the virtual loudspeakers are lying on a unit sphere and are targeted to be distributed uniformly on that unit sphere, said rendering being represented by a matrix multiplication $w(t)=(\psi)^{-1}\cdot c(t)$, wherein w(t) is a vector containing all virtual loudspeaker signals, $\psi$ is a virtual loudspeaker positions mode matrix, and c(t) is a vector of the corresponding HOA coefficient sequences of said HOA data frame representation.

and wherein said HOA data frame representation was normalised such that $$\|w(t)\|_\infty = \max_{1\le j\le O} |w_j(t)| \le 1 \forall t,$$

said apparatus including:

means which form said channel signals by one or more of the operations a), b), c) from said normalised HOA data frame representation:

a) for representing predominant sound signals in said channel signals, multiplying said vector of HOA coefficient sequences c(t) by a mixing matrix A, the Euclidean norm of which mixing matrix A is not greater than '1', wherein mixing matrix A represents a linear combination of coefficient sequences of said normalised HOA data frame representation;

b) for representing an ambient component $c_{AMB}(t)$ in said channel signals, subtracting said predominant sound signals from said normalised HOA data frame representation, and selecting at least part of the coefficient sequences of said ambient component $c_{AMB}(t)$, wherein $\|c_{AMB}(t)\|_2^2 \le \|c(t)\|_2^2$, and transforming the resulting minimum ambient component $c_{AMB,MIN}(t)$ by computing $w_{MIN}(t)=\psi_{MIN}^{-1}\cdot c_{AMB,MIN}(t)$, wherein $\|\psi_{MIN}^{-1}\mu_2<1$ and $\psi_{MIN}$ is a mode matrix for said minimum ambient component $c_{AMB,MIN}(t)$;

c) selecting part of said HOA coefficient sequences c(t), wherein the selected coefficient sequences relate to coefficient sequences of the ambient HOA component to which a spatial transform is applied, and the minimum order $N_{MIN}$ describing the number of said selected coefficient sequences is $N_{MIN}\le 9$;

means which set said lowest integer number $\beta_e$ of bits required for representing said non-differential gain values for said channel signals to $$\beta_e = \lceil \log_2(\lceil \log_2(\sqrt{K_{MAX}} \cdot O)\rceil + 1)\rceil,$$

wherein $K_{MAX}=\max_{1\le N\le N_{MAX}} K(N, \Omega_1^{(N)}, \ldots, \Omega_O^{(n)})$, N is the order, $N_{MAX}$ is a maximum order of interest, $\Omega_1^{(N)}, \ldots, \Omega_O^{(N)}$ are directions of said virtual loudspeakers, $O=(N+1)^2$ is the number of HOA coefficient sequences, and K is a ratio between the squared Euclidean norm $\|\psi\|_2^2$ of said mode matrix and O.

BRIEF DESCRIPTION OF DRAWINGS

Exemplary embodiments of the invention are described with reference to the accompanying drawings, which show in.

DESCRIPTION OF EMBODIMENTS

Even if not explicitly described, the following embodiments may be employed in any combination or sub-combination.

In the following the principle of HOA compression and decompression is presented in order to provide a more detailed context in which the above-mentioned problem occurs. The basis for this presentation is the processing described in the MPEG-H 3D audio document ISO/IEC JTC1/SC29/WG11 N14264, see also EP 2665208 A1, EP 2800401 A1 and EP 2743922 A1. In N14264 the 'directional component' is extended to a 'predominant sound component'. As the directional component, the predominant sound component is assumed to be partly represented by directional signals, meaning monaural signals with a corresponding direction from which they are assumed to imping on the listener, together with some prediction parameters to predict portions of the original HOA representation from the directional signals. Additionally, the predominant sound component is supposed to be represented by 'vector based signals', meaning monaural signals with a corresponding vector which defines the directional distribution of the vector based signals.

HOA Compression

Figure 1:
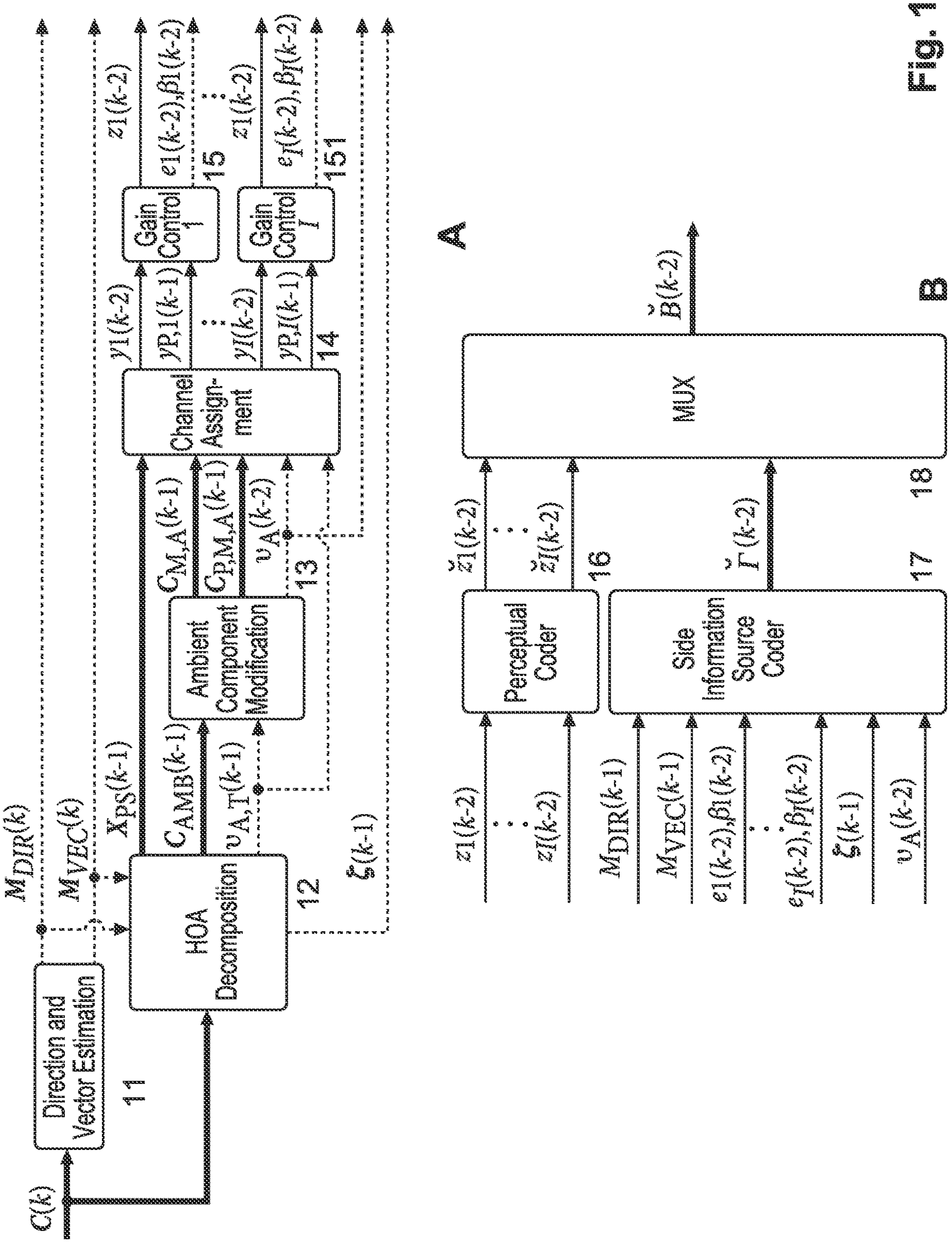
FIG. 1 illustrates an HOA compressor.

The overall architecture of the HOA compressor described in EP 2800401 A1 is illustrated in FIG. 1. It has a spatial HOA encoding part depicted in FIG. 1A and a perceptual and source encoding part depicted in FIG. 1B. The spatial HOA encoder provides a first compressed HOA representation consisting of I signals together with side information describing how to create an HOA representation thereof. In perceptual and side information source coders the I signals are perceptually encoded, and the side information is subjected to source encoding, before multiplexing the two coded representations.

Spatial HOA Encoding

In a first step, a current k-th frame C(k) of the original HOA representation is input to a direction and vector estimation processing step or stage 11, which is assumed to provide the tuple sets $\mathcal{M}_{DIR}(k)$ and $\mathcal{M}_{VEC}(k)$. The tuple set $\mathcal{M}_{DIR}(k)$ consists of tuples of which the first element denotes the index of a directional signal and the second element denotes the respective quantised direction. The tuple set $\mathcal{M}_{VEC}(k)$ consists of tuples of which the first element indicates the index of a vector based signal and the second element denotes the vector defining the directional distribution of the signals, i.e. how the HOA representation of the vector based signal is computed.

Using both tuple sets $\mathcal{M}_{DIR}(k)$ and $\mathcal{M}_{VEC}(k)$, the initial HOA frame C(k) is decomposed in a HOA decomposition step or stage 12 into the frame $X_{PS}(k-1)$ of all predominant sound (i.e. directional and vector based) signals and the frame $C_{AMB}(k-1)$ of the ambient HOA component. Note the delay of one frame which is due to overlap-add processing in order to avoid blocking artefacts. Furthermore, the HOA decomposition step/stage 12 is assumed to output some prediction parameters $\zeta(k-1)$ describing how to predict portions of the original HOA representation from the directional signals, in order to enrich the predominant sound HOA component. Additionally, a target assignment vector $v_{A,T}(k-1)$ containing information about the assignment of predominant sound signals, which were determined in the HOA Decomposition processing step or stage 12, to the I available channels is assumed to be provided. The affected channels can be assumed to be occupied, meaning they are not available to transport any coefficient sequences of the ambient HOA component in the respective time frame.

In the ambient component modification processing step or stage 13 the frame $C_{AMB}(k-1)$ of the ambient HOA component is modified according to the information provided by the target assignment vector $v_{A,T}(k-1)$. In particular, it is determined which coefficient sequences of the ambient HOA component are to be transmitted in the given I channels, depending (amongst other aspects) on the information (contained in the target assignment vector $v_{A,T}(k-1)$) about which channels are available and not already occupied by predominant sound signals. Additionally, a fade-in and fade-out of coefficient sequences is performed if the indices of the chosen coefficient sequences vary between successive frames.

Furthermore, it is assumed that the first $O_{MIN}$ coefficient sequences of the ambient HOA component $C_{AMB}(k-2)$ are always chosen to be perceptually coded and transmitted, where $O_{MIN}=(N_{MIN}+1)^2$ with $N_{MIN}\leq N$ being typically a smaller order than that of the original HOA representation. In order to de-correlate these HOA coefficient sequences, they can be transformed in step/stage 13 to directional signals (i.e. general plane wave functions) impinging from some predefined directions $\Omega_{MIN,d}$, $d=1, \ldots, O_{MIN}$.

Along with the modified ambient HOA component $C_{M,A}(k-1)$ a temporally predicted modified ambient HOA component $C_{P,M,A}(k-1)$ is computed in step/stage 13 and is used in gain control processing steps or stages 15, 151 in order to allow a reasonable look-ahead, wherein the information about the modification of the ambient HOA component is directly related to the assignment of all possible types of signals to the available channels in channel assignment step or stage 14. The final information about that assignment is assumed to be contained in the final assignment vector $v_A(k-2)$. In order to compute this vector in step/stage 13, information contained in the target assignment vector $v_{A,T}(k-1)$ is exploited.

The channel assignment in step/stage 14 assigns with the information provided by the assignment vector $v_A(k-2)$ the appropriate signals contained in frame $X_{PS}(k-2)$ and that contained in frame $C_{M,A}(k-2)$ to the I available channels, yielding the signal frames $y_i(k-2)$, $i=1, \ldots, I$. Further, appropriate signals contained in frame $X_{PS}(k-1)$ and in frame $C_{P,AMB}(k-1)$ are also assigned to the I available channels, yielding the predicted signal frames $y_{P,i}(k-1)$, $i=1, \ldots, I$.

Each of the signal frames $y_i(k-2)$, $i=1, \ldots, I$ is finally processed by the gain control 15, 151 resulting in exponents $e_i(k-2)$ and exception flags $\beta_i(k-2)$, $i=1, \ldots, I$ and in signals $z_i(k-2)$, $i=1, \ldots, I$ in which the signal gain is smoothly modified such as to achieve a value range that is suitable for the perceptual encoder steps or stages 16. Steps/stages 16 output corresponding encoded signal frames $\check{z}_i(k-2)$, $i=1, \ldots, I$. The predicted signal frames $y_{P,i}(k-1)$, $i=1, \ldots, I$ allow a kind of look-ahead in order to avoid severe gain changes between successive blocks. The side information data $\mathcal{M}_{DIR}(k-1)$, $\mathcal{M}_{VEC}(k-1)$, $e_i(k-2)$, $\beta_i(k-2)$, $\zeta(k-1)$ and $v_A(k-2)$ are source coded in side information source coder step or stage 17, resulting in encoded side information frame $\check{\Gamma}(k-2)$. In a multiplexer 18 the encoded signals $\check{Z}_i(k-2)$ of frame $(k-2)$ and the encoded side information data $\check{\Gamma}(k-2)$ for this frame are combined, resulting in output frame $\check{B}(k-2)$.

In a spatial HOA decoder the gain modifications in steps/stages 15, 151 are assumed to be reverted by using the gain control side information, consisting of the exponents $e_i(k-2)$ and the exception flags $\beta_i(k-2)$, $i=1, \ldots, I$.

HOA Decompression

Figure 2:
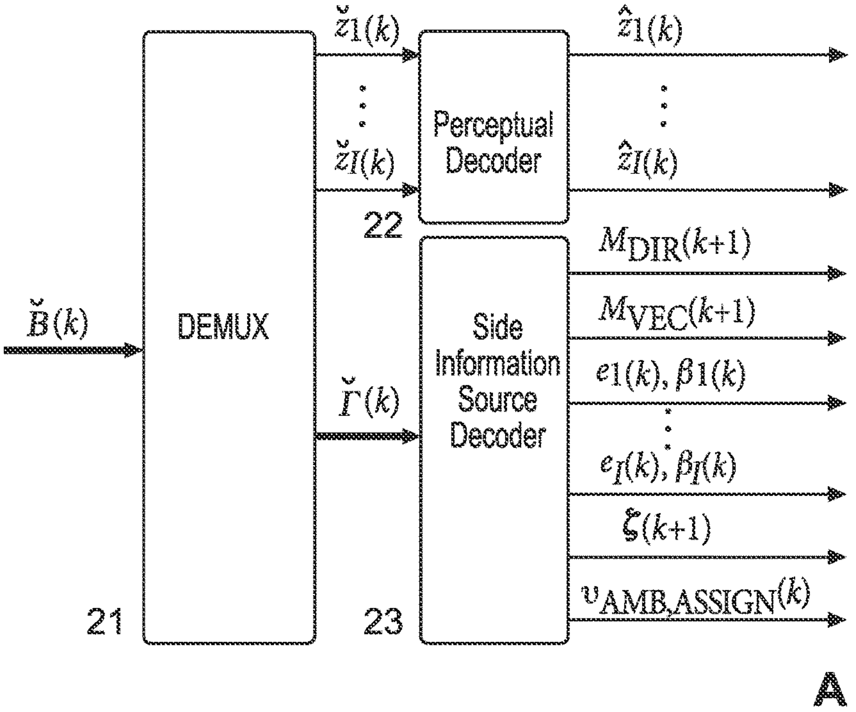
FIG. 2 illustrates an HOA decompressor.
Figure 2:
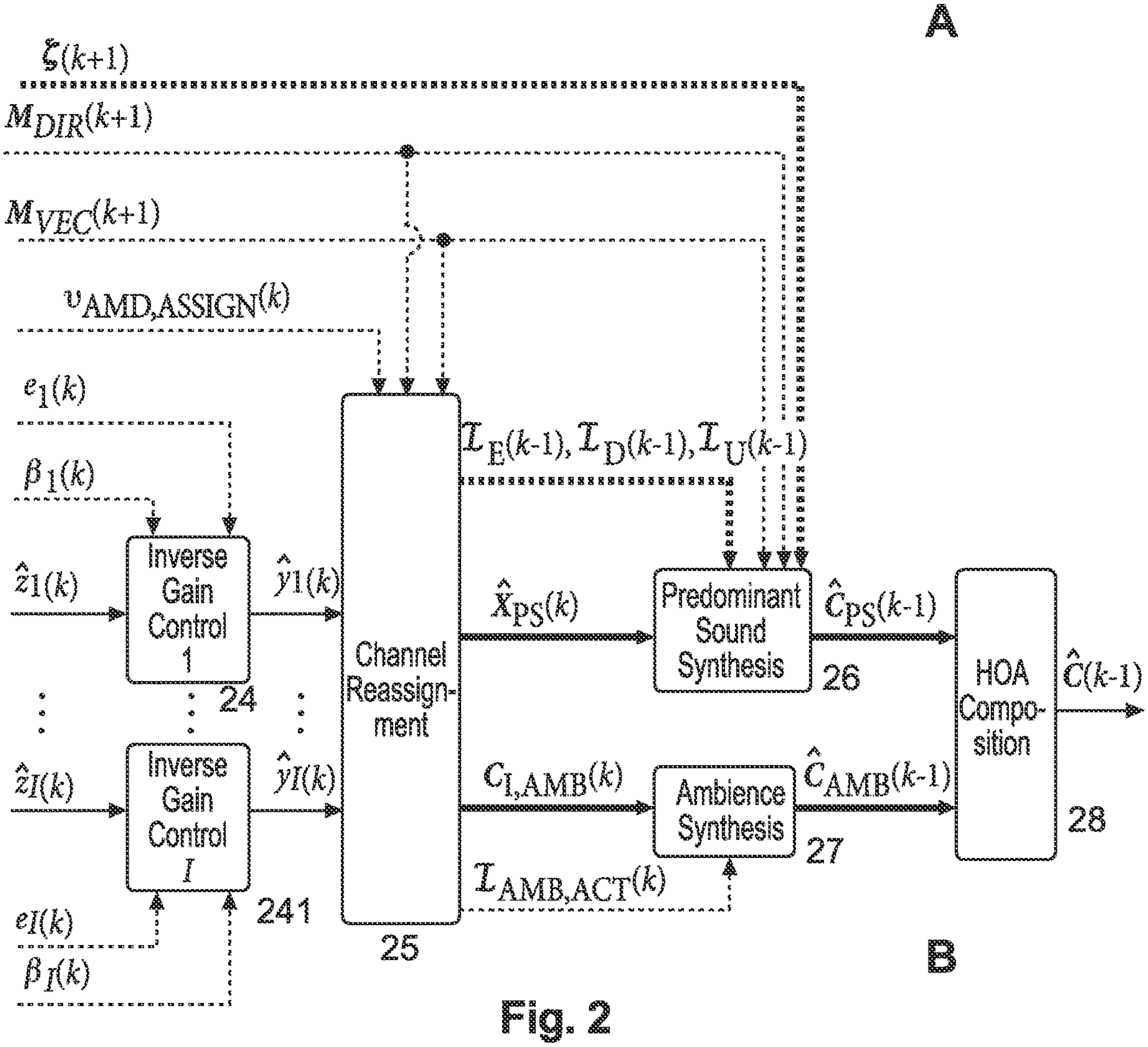

The overall architecture of the HOA decompressor described in EP 2800401 A1 is illustrated in FIG. 2. It consists of the counterparts of the HOA compressor components, which are arranged in reverse order and include a perceptual and source decoding part depicted in FIG. 2A and a spatial HOA decoding part depicted in FIG. 2B.

In the perceptual and source decoding part (representing a perceptual and side info source decoder) a demultiplexing step or stage 21 receives input frame $\check{B}(k)$ from the bit stream and provides the perceptually coded representation $\check{z}_i(k)$, $i=1, \ldots, I$ of the I signals and the coded side information data $\check{\Gamma}(k)$ describing how to create an HOA representation thereof. The $\check{z}_i(k)$ signals are perceptually decoded in a perceptual decoder step or stage 22, resulting in decoded signals $\hat{z}(k)$, $i=1, \ldots, I$. The coded side information data $\check{\Gamma}(k)$ are decoded in a side information source decoder step or stage 23, resulting in data sets $\mathcal{M}_{DIR}(k+1)$, $\mathcal{M}_{VEC}(k+1)$, exponents $e_i(k)$, exception flags $\beta_i(k)$, prediction parameters $\zeta(k+1)$ and an assignment vector $v_{AMB,ASSIGN}(k)$. Regarding the difference between $v_A$ and $v_{AMB,ASSIGN}$, see the above-mentioned MPEG document N14264.

Spatial HOA Decoding

In the spatial HOA decoding part, each of the perceptually decoded signals $\hat{z}_i(k)$, $i=1, \ldots, I$, is input to an inverse gain control processing step or stage 24, 241 together with its associated gain correction exponent $e_i(k)$ and gain correction exception flag $\beta_i(k)$. The i-th inverse gain control processing step/stage provides a gain corrected signal frame $\hat{y}_i(k)$.

All I gain corrected signal frames $\hat{y}_i(k)$, $i=1, \ldots, I$, are fed together with the assignment vector $v_{AMB,ASSIGN}(k)$ and the tuple sets $\mathcal{M}_{DIR}(k+1)$ and $\mathcal{M}_{VEC}(k+1)$ to a channel reassignment step or stage 25, cf. the above-described definition of the tuple sets $\mathcal{M}_{DIR}(k+1)$ and $\mathcal{M}_{VEC}(k+1)$. The assignment vector $v_{AMB,ASSIGN}(k)$ consists of I components which indicate for each transmission channel whether it contains a coefficient sequence of the ambient HOA component and which one it contains. In the channel reassignment step/stage 25 the gain corrected signal frames $\hat{y}_i(k)$ are re-distributed in order to reconstruct the frame $\hat{X}_{PS}(k)$ of all predominant sound signals (i.e. all directional and vector based signals) and the frame $C_{I,AMB}(k)$ of an intermediate representation of the ambient HOA component. Additionally, the set $\mathcal{I}_{AMB,ACT}(k)$ of indices of coefficient sequences of the ambient HOA component active in the k-th frame, and the data sets $\mathcal{I}_E(k-1)$, $\mathcal{I}_D(k-1)$ and $\mathcal{I}_U(k-1)$ of coefficient indices of the ambient HOA component, which have to be enabled, disabled and to remain active in the (k−1)-th frame, are provided.

In a predominant sound synthesis step or stage 26 the HOA representation of the predominant sound component $\hat{C}_{PS}(k-1)$ is computed from the frame $\hat{X}_{PS}(k)$ of all predominant sound signals using the tuple set $\mathcal{M}_{DIR}(k+1)$, the set $\zeta(k+1)$ of prediction parameters, the tuple set $\mathcal{M}_{VEC}(k+1)$ and the data sets $\mathcal{I}_E(k-1)$, $\mathcal{I}_D(k-1)$ and $\mathcal{I}_U(k-1)$.

In an ambience synthesis step or stage 27 the ambient HOA component frame $\hat{C}_{AMB}(k-1)$ is created from the frame $C_{I,AMB}(k)$ of the intermediate representation of the ambient HOA component, using the set $\mathcal{I}_{AMB,ACT}(k)$ of indices of coefficient sequences of the ambient HOA component which are active in the k-th frame. The delay of one frame is introduced due to the synchronisation with the predominant sound HOA component.

Finally, in an HOA composition step or stage 28 the ambient HOA component frame $\hat{C}_{AMB}(k-1)$ and the frame $\hat{C}_{PS}(k-1)$ of predominant sound HOA component are superposed so as to provide the decoded HOA frame $\hat{C}(k-1)$.

Thereafter the spatial HOA decoder creates from the I signals and the side information the reconstructed HOA representation.

In case at encoding side the ambient HOA component was transformed to directional signals, that transform is inversed at decoder side in step/stage 27.

The potential maximum gains of the signals before the gain control processing steps/stages 15, 151 within the HOA compressor are highly dependent on the value range of the input HOA representation. Hence, at first a meaningful value range for the input HOA representation is defined, followed by concluding on the potential maximum gains of the signals before entering the gain control processing steps/stages.

Normalisation of the Input HOA Representation

For using the inventive processing, a normalisation of the (total) input HOA representation signal is to be carried out before. For the HOA compression a frame-wise processing is performed, where the k-th frame C(k) of the original input HOA representation is defined with respect to the vector c(t) of time-continuous HOA coefficient sequences specified in equation (54) in section Basics of Higher Order Ambisonics as $$C(k) := [c((kL+1)T_S)\ c((kL+2)T_S)\ \dots\ c((k+1)LT_S)] \in \mathbb{R}^{O \times L}, \quad (1)$$

where k denotes the frame index, L the frame length (in samples), $O=(N+1)^2$ the number of HOA coefficient sequences and $T_S$ indicates the sampling period.

As mentioned in EP 2824661 A1, a meaningful normalisation of an HOA representation viewed from a practical perspective is not achieved by imposing constraints on the value range of the individual HOA coefficient sequences $c_n^m(t)$, since these time-domain functions are not the signals that are actually played by loudspeakers after rendering. Instead, it is more convenient to consider the 'equivalent spatial domain representation', which is obtained by rendering the HOA representation to O virtual loudspeaker signals $w_j(t)$, $1 \le j \le O$. The respective virtual loudspeaker positions are assumed to be expressed by means of a spherical coordinate system, where each position is assumed to lie on the unit sphere and to have a radius of '1'. Hence, the positions can be equivalently expressed by order dependent directions $\Omega_j^{(N)} \le (\theta_j^{(N)}, \phi_j^{(N)})$, $1 \le j \le O$, where $\theta_j^{(N)}$ and $\phi_j^{(N)}$ denote the inclinations and azimuths, respectively (see also FIG. 6 and its description for the definition of the spherical coordinate system). These directions should be distributed on the unit sphere as uniform as possible, see e.g. J. Fliege, U. Maier, "A two-stage approach for computing cubature formulae for the sphere", Technical report, Fachbereich Mathematik, University of Dortmund, 1999. Node numbers are found at http://www.mathematik.uni-dortmund.de/lsx/research/projects/fliege/nodes/nodes.html for the computation of specific directions. These positions are in general dependent on the kind of definition of 'uniform distribution on the sphere', and hence, are not unambiguous.

The advantage of defining value ranges for virtual loudspeaker signals over defining value ranges for HOA coefficient sequences is that the value range for the former can be set intuitively equally to the interval [−1,1[ as is the case for conventional loudspeaker signals assuming PCM representation. This leads to a spatially uniformly distributed quantisation error, such that advantageously the quantisation is applied in a domain that is relevant with respect to actual listening. An important aspect in this context is that the number of bits per sample can be chosen to be as low as it typically is for conventional loudspeaker signals, i.e. 16, which increases the efficiency compared to the direct quantisation of HOA coefficient sequences, where usually a higher number of bits (e.g. 24 or even 32) per sample is required.

For describing the normalisation process in the spatial domain in detail, all virtual loudspeaker signals are summarised in a vector as $$w(t) := [w_1(t)\ \dots\ w_O(t)]^T, \quad (2)$$

where $(\bullet)^T$ denotes transposition. Denoting the mode matrix with respect to the virtual directions $\Omega_j^{(N)}$, $1 \le j \le O$, by $\psi$, which is defined by $$\Psi := [S_1\ \cdots\ S_O] \in \mathbb{R}^{O \times O} \quad (3)$$

with $S_j :=$ (4)

$$\left[S_0^0(\Omega_j^{(N)})\ S_1^{-1}(\Omega_j^{(N)})\ S_1^0(\Omega_j^{(N)})\ S_1^1(\Omega_j^{(N)})\ \cdots\ S_N^{N-1}(\Omega_j^{(N)})\ S_N^N(\Omega_j^{(N)})\right]^T,$$

the rendering process can be formulated as a matrix multiplication $$w(t) = (\Psi)^{-1} \cdot c(t). \quad (5)$$

Using these definitions, a reasonable requirement on the virtual loudspeaker signals is:

$$\boxed{\|w(lT_S)\|_\infty = \max_{1 \le j \le O} |w_j(lT_S)| \le 1\ \forall\, l}, \quad (6)$$

which means that the magnitude of each virtual loudspeaker signal is required to lie within the range [−1,1[. A time instant of time t is represented by a sample index l and a sample period $T_S$ of the sample values of said HOA data frames.

The total power of the loudspeaker signals consequently satisfies the condition $$\|w(lT_s\|_2^2 = \sum_{j=1}^{O} |w_j(lT_S)|^2 \le O\ \forall\, l. \quad (7)$$

The rendering and the normalisation of the HOA data frame representation is carried out upstream of the input C(k) of FIG. 1A.

Consequences for the Signal Value Range Before Gain Control

Assuming that the normalisation of the input HOA representation is performed according to the description in section Normalisation of the input HOA representation, the value range of the signals $y_i$, i=1, . . . , l, which are input to the gain control processing unit 15, 151 in the HOA compressor, is considered in the following. These signals are created by the assignment to the available I channels of one or more of the HOA coefficient sequences, or predominant sound signals $x_{PS,d}$, d=1, . . . , D, and/or particular coefficient sequences of the ambient HOA component $c_{AMB,n}$, n=1, . . . , O, to part of which a spatial transform is applied. Hence, it is necessary to analyse the possible value range of these mentioned different signal types under the normalisation assumption in equation (6). Since all kind of signals are intermediately computed from the original HOA coefficient sequences, a look at their possible value ranges is taken.

The case in which only one or more HOA coefficient sequences are contained in the I channels is not depicted in FIG. 1A and FIG. 2B, i.e. in such case the HOA decomposition, ambient component modification and the corresponding synthesis blocks are not required.

Consequences for the Value Range of the HOA Representation

The time-continuous HOA representation is obtained from the virtual loudspeaker signals by $$c(t) = \Psi w(t), \tag{8}$$

which is the inverse operation to that in equation (5). Hence, the total power of all HOA coefficient sequences is bounded as follows:

$$\|\|c(lT_S)\|_2^2 \le \|\Psi\|_2^2 \cdot \|w(lT_S)\|_2^2 \le \|\Psi\|_2^2 \cdot O, \tag{9}$$

using equations (8) and (7).

Under the assumption of N3D normalisation of the Spherical Harmonics functions, the squared Euclidean norm of the mode matrix can be written by $$\|\Psi\|_2^2 = K \cdot O, \tag{10a}$$

where $$K = \frac{\|\Psi\|_2^2}{O} \tag{10b}$$

denotes the ratio between the squared Euclidean norm of the mode matrix and the number O of HOA coefficient sequences. This ratio is dependent on the specific HOA order N and the specific virtual loudspeaker directions $\Omega_j^{(N)}$, 1≤j≤O, which can be expressed by appending to the ratio the respective parameter list as follows:

$$K = K(N, \Omega_1^{(N)}, \ldots, \Omega_O^{(N)}). \tag{10c}$$

Figure 3:
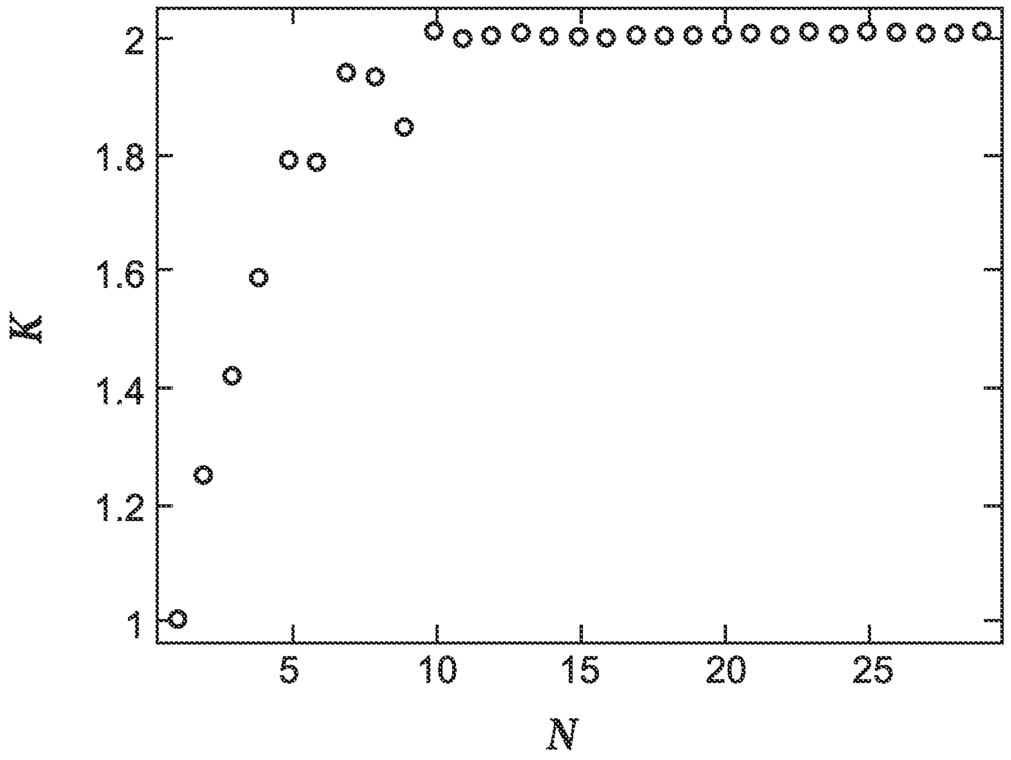
FIG. 3 illustrates scaling values K for virtual directions $\Omega_j^{(N)}$, $1\le j\le O$, for HOA orders N=1, . . . , 29.

FIG. 3 shows the values of K for virtual directions $\Omega_j^{(N)}$, 1≤j≤O, according to the above-mentioned Fliege et al. article for HOA orders N=1, . . . , 29.

Combining all previous arguments and considerations provides an upper bound for the magnitude of HOA coefficient sequences as follows:

$$\boxed{\|c(lT_S\|_\infty \le \|c(lT_S)\|_2 \le \sqrt{K \cdot O}}, \tag{11}$$

wherein the first inequality results directly from the norm definitions.

It is important to note that the condition in equation (6) implies the condition in equation (11), but the opposite does not hold, i.e. equation (11) does not imply equation (6).

A further important aspect is that under the assumption of nearly uniformly distributed virtual loudspeaker positions the column vectors of the mode matrix ψ, which represent the mode vectors with respect to the virtual loudspeaker positions, are nearly orthogonal to each other and have an Euclidean norm of N+1 each. This property means that the spatial transform nearly preserves the Euclidean norm except for a multiplicative constant, i.e.

$$\|c(lT_S)\|_2 \approx (N+1)\|w(lT_S)\|_2. \tag{12}$$

The true norm $\|c(lT_S)\|_2$ differs the more from the approximation in equation (12) the more the orthogonality assumption on the mode vectors is violated.

Consequences for the Value Range of Predominant Sound Signals

Both types of predominant sound signals (directional and vector-based) have in common that their contribution to the HOA representation is described by a single vector $v_1 \in \mathbb{R}^O$ with Euclidean norm of $$N+1, \text{ i.e. } \|v_1\|_2 = N+1. \tag{13}$$

In case of the directional signal this vector corresponds to the mode vector with respect to acertain signal source direction $$\Omega_{S,1}, \text{ i.e. } v_1 = S(\Omega_{S,1}) \tag{14}$$

$$:= \left[S_0^0(\Omega_{S,1})\ S_1^{-1}(\Omega_{S,1})\ S_1^0(\Omega_{S,1})\ S_1^1(\Omega_{S,1})\ \cdots\ S_N^{N-1}(\Omega_{S,1})\ S_N^N(\Omega_{S,1})\right]^T \tag{15}$$

This vector describes by means of an HOA representation a directional beam into the signal source direction $\Omega_{S,1}$. In the case of a vector-based signal, the vector $v_1$ is not constrained to be a mode vector with respect to any direction, and hence may describe a more general directional distribution of the monaural vector based signal.

In the following is considered the general case of D predominant sound signals $x_d(t)$, d=1, . . . , D, which can be collected in the vector x(t) according to $$x(t) = [x_1(t)\ x_2(t)\ \cdots\ x_D(t)]^T. \tag{16}$$

These signals have to be determined based on the matrix $$V := [\, v_1 \quad v_2 \quad \cdots \quad v_D \,] \tag{17}$$

which is formed of all vectors $v_d$, d=1, . . . , D, representing the directional distribution of the monaural predominant sound signals $x_d(t)$, d=1, . . . , D.

For a meaningful extraction of the predominant sound signals x(t) the following constraints are formulated:

a) Each predominant sound signal is obtained as a linear combination of the coefficient sequences of the original HOA representation, i.e.

$$x(t) = A \cdot c(t), \tag{18}$$

where $$A \in \mathbb{R}^{D \times O}$$

denotes the mixing matrix.

b) The mixing matrix A should be chosen such that its Euclidean norm does not exceed the value of '1', i.e.

$$\|A\|_2 \overset{!}{\le} 1, \tag{19}$$

and such that the squared Euclidean norm (or equivalently power) of the residual between the original HOA representation and that of the predominant sound signals is not greater than the squared Euclidean norm (or equivalently power) of the original HOA representation, i.e.

$$\|c(t) - V \cdot x(t)\| =_2^2 \overset{!}{\le} \|c(t)\|_2^2. \tag{20}$$

By inserting equation (18) into equation (20) it can be seen that equation (20) is equivalent to the constraint $$\|I - V \cdot A\|_2 \overset{!}{\le} 1, \tag{21}$$

where I denotes the identity matrix.

From the constraints in equation (18) and in (19) and from the compatibility of the Euclidean matrix and vector norms, an upper bound for the magnitudes of the predominant sound signals is found by $$\|x(lT_S\|_\infty \le \|x(lT_S\|_2 \tag{22}$$

$$\le \|A\|_2 \|c(lT_S)\|_2 \tag{23}$$

$$\le \sqrt{K} \cdot O, \tag{24}$$

using equations (18), (19) and (11). Hence, it is ensured that the predominant sound signals stay in the same range as the original HOA coefficient sequences (compare equation (11)), i.e.

$$\boxed{\|x(lT_S\|_\infty \le \sqrt{K} \cdot O}. \tag{25}$$

Example for Choice of Mixing Matrix

An example of how to determine the mixing matrix satisfying the constraint (20) is obtained by computing the predominant sound signals such that the Euclidean norm of the residual after extraction is minimised, i.e.

$$x(t) = \operatorname{argmin}_{x(t)} \|V \cdot x(t) - c(t)\|_2. \tag{26}$$

The solution to the minimisation problem in equation (26) is given by $$x(t) = V^{+} c(t), \tag{27}$$

where $(\bullet)^{+}$ indicates the Moore-Penrose pseudo-inverse. By comparison of equation (27) with equation (18) it follows that, in this case, the mixing matrix is equal to the Moore-Penrose pseudo inverse of the matrix V, i.e. $A=V^{+}$.

Nevertheless, matrix V still has to be chosen to satisfy the constraint (19), i.e.

$$\boxed{\|V^{+}\|_2 \overset{!}{\le} 1}. \tag{28}$$

In case of only directional signals, where matrix V is the mode matrix with respect to some source signal directions $$\Omega_{S,d},\ d = 1, \ldots, D, \text{ i.e. } V = [\, S(\Omega_{S,1}) \quad S(\Omega_{S,2}) \quad \cdots \quad S(\Omega_{S,D}) \,], \tag{29}$$

the constraint (28) can be satisfied by choosing the source signal directions $\Omega_{S,d}$, d=1, . . . , D, such that the distance of any two neighboring directions is not too small.

Consequences for the Value Range of Coefficient Sequences of the Ambient HOA Component The ambient HOA component is computed by subtracting from the original HOA representation the HOA representation of the predominant sound signals, i.e.

$$c_{AMB}(t) = c(t) - V \cdot x(t). \tag{30}$$

If the vector of predominant sound signals x(t) is determined according to the criterion (20), it can be concluded that $$\|c_{AMB}(lT_S)\|_\infty \le \|c_{AMB}(lT_S)\|_2 \tag{31}$$

$$\overset{(30)}{=} \|c(lT_S) - V \cdot x(lT_S\|_2 \tag{32}$$

$$\overset{(20)}{\le} \|c(lT_S)\|_2 \tag{33}$$

$$\overset{(11)}{=} \sqrt{K} \cdot O. \tag{34}$$

Value Range of Spatially Transformed Coefficient Sequences of the Ambient HOA Component A further aspect in the HOA compression processing proposed in EP 2743922 A1 and in the above-mentioned MPEG document N14264 is that the first $O_{MIN}$ coefficient sequences of the ambient HOA component are always chosen to be assigned to the transport channels, where $O_{MIN}=(N_{MIN}+1)^2$ with $N_{MIN}\leq N$ being typically a smaller order than that of the original HOA representation. In order to de-correlate these HOA coefficient sequences, they can be transformed to virtual loudspeaker signals impinging from some predefined directions $\Omega_{MIN,d}$, d=1, . . . , $O_{MIN}$ (in analogy to the concept described in section Normalisation of the input HOA representation).

Defining the vector of all coefficient sequences of the ambient HOA component with order index $n\leq N_{MIN}$ by $c_{AMB,MIN}(t)$ and the mode matrix with respect to the virtual directions $\Omega_{MIN,d}$, d=1, . . . , $O_{MIN}$, by $\psi_{MIN}$, the vector of all virtual loudspeaker signals (defined by) $w_{MIN}(t)$ is obtained by $$w_{MIN}(t) = \Psi_{MIN}^{-1} \cdot c_{AMB,MIN}(t). \quad (35)$$

Hence, using the compatibility of the Euclidean matrix and vector norms, $$\|w_{MIN}(lT_S)\|_\infty \leq \|w_{MIN}(lT_S)\|_2 \quad (36)$$

$$\overset{(35)}{\leq} \|\Psi_{MIN}^{-1}\|_2 \cdot \|c_{AMB,MIN}(lT_S)\|_2 \quad (37)$$

$$\overset{(34)}{\leq} \|\Psi_{MIN}^{-1}\|_2 \cdot \sqrt{K} \cdot O. \quad (38)$$

Figure 4:
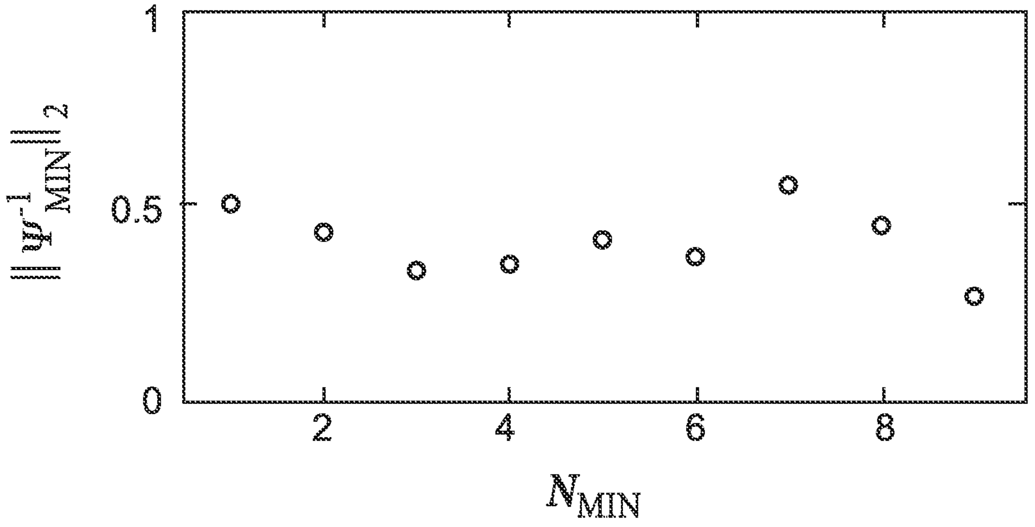
FIG. 4 illustrates Euclidean norms of inverse mode matrices $\psi^{-1}$ for virtual directions $\Omega_{MIN,d}$, d=1, . . . , $O_{MIN}$ for HOA orders $N_{MIN}$=1, . . . , 9.

In the above-mentioned MPEG document N14264 the virtual directions $\Omega_{MIN,d}$, d=1, . . . , $O_{MIN}$, are chosen according to the above-mentioned Fliege et al. article. The respective Euclidean norms of the inverse of the mode matrices $\Omega_{MIN}$ are illustrated in FIG. 4 for orders $N_{MIN}$= 1, . . . , 9. It can be seen that $$\|\Psi_{MIN}^{-1}\|_2 < 1 \text{ for } N_{MIN} = 1, \ldots , 9. \quad (39)$$

However, this does in general not hold for $N_{MIN}>9$, where the values of $\|\psi_{MIN}^{-1}\|_2$ are typically much greater than '1'. Nevertheless, at least for $1\leq N_{MIN}\leq 9$ the amplitudes of the virtual loudspeaker signals are bounded by $$\boxed{\|w_{MIN}(lT_S)\|_\infty \overset{(38),Fig.4}{\leq} \sqrt{K} \cdot O \text{ for } 1 \leq N_{MIN} \leq 9} \quad (40)$$

By constraining the input HOA representation to satisfy the condition (6), which requires the amplitudes of the virtual loudspeaker signals created from this HOA representation not to exceed a value of '1', it can be guaranteed that the amplitudes of the signals before gain control will not exceed the value $\sqrt{K}\cdot O$ (see equations (25), (34) and (40)) under the following conditions:

a) The vector of all predominant sound signals x(t) is computed according to the equation/constraints (18), (19) and (20);

b) The minimum order $N_{MIN}$, that determines the number $O_{MIN}$ of first coefficient sequences of the ambient HOA component to which a spatial transform is applied, has to be lower than '9', if as virtual loudspeaker positions those defined in the above-mentioned Fliege et al. article are used.

It can be further concluded that the amplitudes of the signals before gain control will not exceed the value $$\sqrt{K_{MAX}} \cdot O$$

for any order N up to a maximum order $N_{MAX}$ of interest, i.e. $1\leq N\leq N_{MAX}$, where $$K_{MAX} = \max_{1\leq N\leq N_{MAX}} K(N, \Omega_1^{(N)}, \ldots , \Omega_O^{(N)}). \quad (41a)$$

In particular, it can be concluded from FIG. 3 that if the virtual loudspeaker directions $\Omega_j^{(N)}$, $1\leq j\leq 0$, for the initial spatial transform are assumed to be chosen according to the distribution in the Fliege et al. article, and if additionally the maximum order of interest is assumed to be $N_{MAX}=29$ (as e.g. in MPEG document N14264), then the amplitudes of the signals before gain control will not exceed the value 1.5 O, since $$\sqrt{K_{MAX}} < 1.5$$

in this special case. I.e., $$\sqrt{K_{MAX}} = 1.5$$

call be selected.

$K_{MAX}$ is dependent on the maximum order of interest $N_{MAX}$ and the virtual loudspeaker directions $\Omega_j^{(N)}$, $1\leq j\leq O$, which can be expressed by $$K_{MAX} = K_{MAX}(\{\Omega_1^{(N)}, \ldots , \Omega_O^{(N)} \mid 1 \leq N \leq N_{MAX}\}). \quad (41b)$$

Hence, the minimum gain applied by the gain control to ensure that the signals before perceptual coding lie within the interval [−1, 1] is given by $2^{e_{MIN}}$, where $$e_{MIN} = -\lceil \log_2(\sqrt{K_{MAX}} \cdot O) \rceil < 0. \quad (41c)$$

In case the amplitudes of the signals before the gain control are too small, it is proposed in MPEG document N14264 that it is possible to smoothly amplify them with a factor up to $2^{e_{MAX}}$, where $e_{MAX}\geq 0$ is transmitted as side information within the coded HOA representation.

Thus, each exponent to base '2', describing within an access unit the total absolute amplitude change of a modified signal caused by the gain control processing unit from the first up to a current frame, can assume any integer value within the interval $[e_{MIN}, e_{MAX}]$. Consequently, the (lowest integer) number $\beta_e$ of bits required for coding it is given by $$\beta_e = \lceil \log_2(|e_{MIN}| + e_{MAX} + 1) \rceil = \left\lceil \log_2\left(\left\lceil \log_2\left(\sqrt{K_{MAX}} \cdot O\right)\right\rceil + e_{MAX} + 1\right)\right\rceil. \tag{42}$$

In case the amplitudes of the signals before the gain control are not too small, equation (42) can be simplified:

$$\beta_e = \lceil \log_2(|e_{MIN}| + 1) \rceil = \left\lceil \log_2\left(\left\lceil \log_2\left(\sqrt{K_{MAX}} \cdot O\right)\right\rceil + 1\right)\right\rceil. \tag{42a}$$

This number of bits $\beta_e$ can be calculated at the input of the gain control steps/stages 15, . . . , 151.

Using this number $\beta_e$ of bits for the exponent ensures that all possible absolute amplitude changes caused by the HOA compressor gain control processing units 15, . . . , 151 can be captured, allowing the start of the decompression at some predefined entry points within the compressed representation.

When starting decompression of the compressed HOA representation in the HOA decompressor, the non-differential gain values representing the total absolute amplitude changes assigned to the side information for some data frames and received from demultiplexer 21 out of the received data stream $\breve{B}$ are used in inverse gain control steps or stages 24, . . . , 241 for applying a correct gain control, in a manner inverse to the processing that was carried out in gain control steps/stages 15, . . . , 151.

Further Embodiment

When implementing a particular HOA compression/decompression system as described in sections HOA compression, Spatial HOA encoding, HOA decompression and Spatial HOA decoding, the amount $\beta_e$ of bits for the coding of the exponent has to be set according to equation (42) in dependence on a scaling factor $K_{MAX,DES}$, which itself is dependent on a desired maximum order $N_{MAX,DES}$ of HOA representations to be compressed and certain virtual loudspeaker directions $\Omega_{DES,1}^{(N)}, \ldots, \Omega_{DES,O}^{(N)}$, $1 \le N \le N_{MAX}$.

For instance, when assuming $N_{MAX,DES}=29$ and choosing the virtual loudspeaker directions according to the Fliege et al. article, a reasonable choice would be $$\sqrt{K_{MAX,DES}} = 1.5.$$

In that situation the correct compression is guaranteed for HOA representations of order N with $1 \le N \le N_{MAX}$ which are normalised according to section Normalisation of the input HOA representation using the same virtual loudspeaker directions $\Omega_{DES,1}^{(N)}, \ldots, \Omega_{DES,O}^{(N)}$. However, this guarantee cannot be given in case of an HOA representation which is also (for efficiency reasons) equivalently represented by virtual loudspeaker signals in PCM format, but where the directions $\Omega_j^{(N)}$, $1 \le j \le O$, of the virtual loudspeakers are chosen to be different to the virtual loudspeaker directions $\Omega_{DES,1}^{(N)}, \ldots, \Omega_{DES,O}^{(N)}$, assumed at the system design stage.

Due to this different choice of virtual loudspeaker positions, even though the amplitudes of these virtual loudspeaker signals lie within interval [1,1[, it cannot be guaranteed anymore that the amplitudes of the signals before gain control will not exceed the value $$\sqrt{K_{MAX,DES}} \cdot O.$$

And hence it cannot be guaranteed that this HOA representation has the proper normalisation for the compression according to the processing described in MPEG document N14264.

Figure 5:
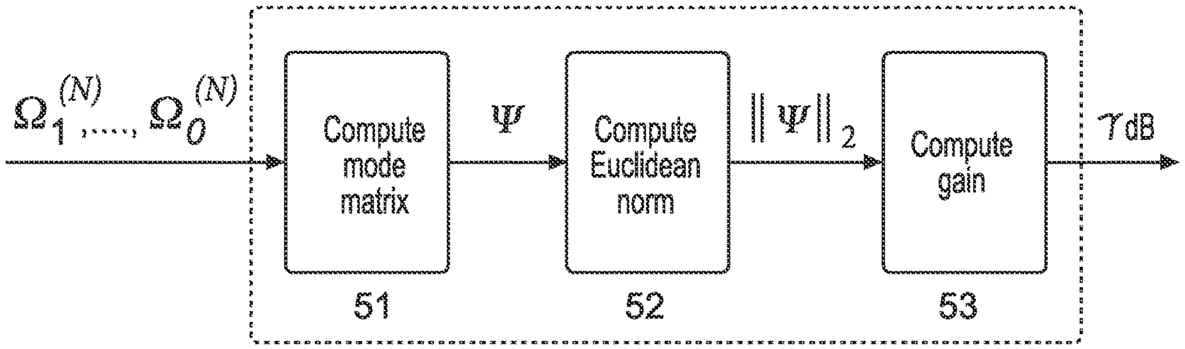
FIG. 5 illustrates determination of maximally allowed magnitude $\gamma_{dB}$ of signals of virtual loudspeakers at positions $\Omega_j^{(N)}$, $1\le j\le O$, where $O=(N+1)_2$.

In this situation it is advantageous to have a system which provides, based on the knowledge of the virtual loudspeaker positions, the maximally allowed amplitude of the virtual loudspeaker signals in order to ensure the respective HOA representation to be suitable for compression according to the processing described in MPEG document N14264. In FIG. 5 such a system is illustrated. It takes as input the virtual loudspeaker positions $\Omega_j^{(N)}$, $1 \le j \le O$, where $O=(N+1)^2$ with $N \in {}_0$, and provides as output the maximally allowed amplitude $\gamma_{dB}$ (measured in decibels) of the virtual loudspeaker signals. In step or stage 51 the mode matrix $\psi$ with respect to the virtual loudspeaker positions is computed according to equation (3). In a following step or stage 52 the Euclidean norm $\|Y'\|_2$ of the mode matrix is computed. In a third step or stage 53 the amplitude $\gamma$ is computed as the minimum of '1' and the quotient between the product of the square root of the number of the virtual loudspeaker positions and $K_{MAX,DES}$ and the Euclidean norm of the mode matrix, i.e.

$$\gamma = \min\left(1, \frac{\sqrt{O} \cdot \sqrt{K_{MAX,DES}}}{\|\Psi\|_2}\right).$$

The value in decibels is obtained by $$\gamma_{dB} = 20\log_{10}(\gamma), \tag{44}$$

For explanation: from the derivations above it can be seen that if the magnitude of the HOA coefficient sequences does not exceed a value $$\sqrt{K_{MAX,DES}} \cdot O,$$

i.e. if all the signals $$\|c(lT_S)\|_\infty \le \sqrt{K_{MAX,DES}} \cdot O, \tag{45}$$

before the gain control processing units 15, 151 will accordingly not exceed this value, which is the requirement for a proper HOA compression.

From equation (9) it is found that the magnitude of the HOA coefficient sequences is bounded by $$\|c(lT_S)\|_\infty \le \|c(lT_S)\|_2 \le \|\Psi\|_2 \cdot \|w(lT_S)\|_2. \tag{46}$$

Consequently, if $\gamma$ is set according to equation (43) and the virtual loudspeaker signals in PCM format satisfy $$\|w(lT_S)\|_\infty \le \gamma, \tag{47}$$

it follows from equation (7) that $$\|w(lT_S)\|_2 \le \gamma \cdot \sqrt{0} \tag{48}$$

and that the requirement (45) is satisfied.

I.e., the maximum magnitude value of '1' in equation (6) is replaced by maximum magnitude value $\gamma$ in equation (47).

Basics of Higher Order Ambisonics

Figure 6:
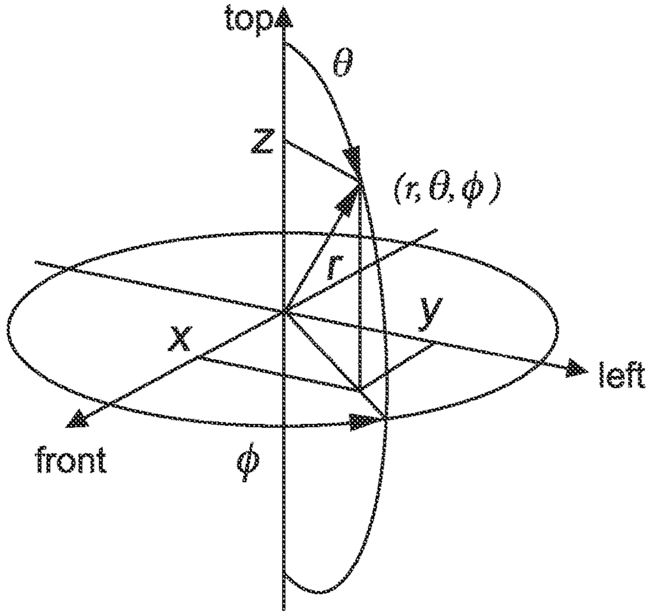
FIG. 6 illustrates spherical coordinate system.

Higher Order Ambisonics (HOA) is based on the description of a sound field within a compact area of interest, which is assumed to be free of sound sources. In that case the spatiotemporal behaviour of the sound pressure p(t,x) at time t and position x within the area of interest is physically fully determined by the homogeneous wave equation. In the following a spherical coordinate system as shown in FIG. 6 is assumed. In the used coordinate system, the x axis points to the frontal position, the y axis points to the left, and the z axis points to the top. A position in space $x=(r, \theta, \phi)^T$ is represented by a radius r>0 (i.e. the distance to the coordinate origin), an inclination angle $\theta \in [0, \pi]$ measured from the polar axis z and an azimuth angle $\phi \in [0,2\pi[$ measured counter-clockwise in the x-y plane from the x axis. Further, $(\bullet)^T$ denotes the transposition.

Then, it can be shown from the "Fourier Acoustics" text book that the Fourier transform of the sound pressure with respect to time denoted by $\mathcal{F}_t(\bullet)$, i.e.

$$P(\omega, x) = \mathcal{F}_t(p(t, x)) = \int_{-\infty}^{\infty} p(t, x) e^{-i\omega f} dt \tag{49}$$

with ω denoting the angular frequency and i indicating the imaginary unit, may be expanded into the series of Spherical Harmonics according to $$P(\omega = kc_s, r, \theta, \phi) = \sum_{n=0}^{N} \sum_{m=-n}^{n} A_n^m(k) j_n(kr) S_n^m(\theta, \phi), \tag{50}$$

wherein $c_s$ denotes the speed of sound and k denotes the angular wave number, which is related to the angular frequency ω by $$k = \frac{\omega}{c_s}.$$

Further, $j_n(\bullet)$ denote the spherical Bessel functions of the first kind and $S_n^m(\theta, \phi)$ denote the real valued Spherical Harmonics of order n and degree m, which are defined in section Definition of real valued Spherical Harmonics. The expansion coefficients $A_n^m(k)$ only depend on the angular wave number k. Note that it has been implicitly assumed that the sound pressure is spatially band-limited. Thus, the series is truncated with respect to the order index n at an upper limit N, which is called the order of the HOA representation.

If the sound field is represented by a superposition of an infinite number of harmonic plane waves of different angular frequencies ω arriving from all possible directions specified by the angle tuple (θ, ϕ), it can be shown (see B. Rafaely, "Plane-wave decomposition of the sound field on a sphere by spherical convolution", J. Acoust. Soc. Am., vol. 4(116), pages 2149-2157, October 2004) that the respective plane wave complex amplitude function C(ω, θ, ϕ) can be expressed by the following Spherical Harmonics expansion $$C(\omega = kc_S, \theta, \phi) = \sum_{n=0}^{N} \sum_{m=-n}^{n} C_n^m(k) S_n^m(\theta, \phi), \tag{51}$$

where the expansion coefficients $C_n^m(k)$ are related to the expansion coefficients $A_n^m(k)$ by $$A_n^m(k) = i^n C_n^m(k). \tag{52}$$

Assuming the individual coefficients $C_n^m(k=\omega/c_s)$ to be functions of the angular frequency ω, the application of the inverse Fourier transform (denoted by $\mathcal{F}^{-1}(\bullet)$) provides time domain functions $$c_n^m(t) = \mathcal{F}_t^{-1}(C_n^m(\omega/c_s)) = \frac{1}{2\pi} \int_{-\infty}^{\infty} C_n^m\left(\frac{\omega}{c_s}\right) e^{i\omega t} d\omega \tag{53}$$

for each order n and degree m. These time domain functions are referred to as continuous-time HOA coefficient sequences here, which can be collected in a single vector c(t) by $$c(t) = [\, c_0^0(t) \;\; c_1^{-1}(t) \;\; c_1^0(t) \;\; c_1^1(t) \;\; c_2^{-2}(t) \;\; c_2^{-1}(t) \;\; c_2^0(t) \;\; c_2^1(t) \;\; c_2^2(t) \;\; \cdots \;\; c_N^{N-1}(t) \;\; c_N^N(t)\,]^T \tag{54}$$

The position index of an HOA coefficient sequence $c_n^m(t)$ within vector c(t) is given by n(n+1)+1+m. The overall number of elements in vector c(t) is given by $O=(N+1)^2$.

The final Ambisonics format provides the sampled version of c(t) using a sampling frequency $f_S$ as $$\{c(lT_S)\}_{l\in\mathbb{N}} = \{c(T_S), c(2T_S), c(3T_S), c(4T_S), \ldots\} \tag{55}$$

where $T_S=1/f_S$ denotes the sampling period. The elements of $c(lT_S)$ are referred to as discrete-time HOA coefficient sequences, which can be shown to always be real-valued. This property also holds for the continuous-time versions $c_n^m(t)$.

Definition of Real Valued Spherical Harmonics

The real-valued spherical harmonics $S_n^m(\theta, \phi)$ (assuming SN3D normalisation according to J. Daniel, "Représentation de champs acoustiques, application à la transmission et à la reproduction de scènes sonores complexes dans un contexte multimédia", PHD thesis, Université Paris, 6, 2001, chapter 3.1) are given by $$S_n^m(\theta,\phi) = \sqrt{(2n+1)\frac{(n-|m|)!}{(n+|m|)!}}\,P_{n,|m|}(\cos\theta)trg_m(\phi) \tag{56}$$

with $$trg_m(\phi) = \begin{cases} \sqrt{2}\cos(m\phi) & m>0 \\ 1 & m=0 \\ -\sqrt{2}\sin(m\phi) & m<0 \end{cases}. \tag{57}$$

The associated Legendre functions $P_{n,m}(x)$ are defined as $$P_{n,m}(x) = (1-x^2)^{m/2}\frac{d^m}{dx^m}P_n(x),\ m \ge 0 \tag{58}$$

with the Legendre polynomial $P_n(x)$ and, unlike in E. G. Williams, "Fourier Acoustics", vol. 93 of Applied Mathematical Sciences, Academic Press, 1999, without the Condon-Shortley phase term $(-1)^m$.

The inventive processing can be carried out by a single processor or electronic circuit, or by several processors or electronic circuits operating in parallel and/or operating on different parts of the inventive processing.

The instructions for operating the processor or the processors can be stored in one or more memories.

The invention claimed is:

1. A method for determining a lowest integer number $\beta_e$ of bits representing non-differential gain values corresponding to amplitude changes for channel signals of Higher Order Ambisonics (HOA) data frames, the method comprising:

determining by a processor the integer number βe of bits based on $$\beta_e = \lceil \log_2(\lceil \log_2(\sqrt{K_{MAX}}\cdot O)\rceil + 1)\rceil,$$

wherein $K_{MAX}$ is a constant that is determined based on an ambisonics order, $O=(N+1)^2$ is a number of HOA coefficient sequences, and N is the ambisonics order.

* * * * *